United States Patent [19]
Bradshaw et al.

[11] Patent Number: 4,769,176
[45] Date of Patent: Sep. 6, 1988

[54] BIPHENYL ESTERS AND LIQUID CRYSTAL MATERIALS AND DEVICES CONTAINING THEM

[75] Inventors: Madeline J. Bradshaw; Edward P. Raynes, both of Worcester; David I. Bishop, Dorset; Ian C. Sage, Dorset; John A. Jenner, Dorset, all of England

[73] Assignee: The Secretary of State for Defence In Her Britannic Majesty's Government of the United Kingdom of Great Britain and Northern Ireland, London, England

[21] Appl. No.: 923,825

[22] PCT Filed: Jan. 21, 1986

[86] PCT No.: PCT/GB86/00040
§ 371 Date: Oct. 30, 1986
§ 102(e) Date: Oct. 30, 1986

[87] PCT Pub. No.: WO86/04327
PCT Pub. Date: Jul. 31, 1986

[30] Foreign Application Priority Data

Jan. 22, 1985 [GB] United Kingdom ................. 8501509

[51] Int. Cl.$^4$ ........................ G02F 1/10; C09K 19/12; C07C 69/76
[52] U.S. Cl. ........................... 252/299.65; 252/399.01; 252/299.63; 252/299.64; 350/350 R; 350/350 S; 560/1; 560/59; 560/73; 560/102; 560/105; 560/108; 560/126; 560/138; 560/141; 558/370
[58] Field of Search ...................... 252/299.63, 299.64, 252/299.65, 299.01; 350/350 R, 350 S; 560/59, 73, 102, 105, 108, 126, 1, 138, 141; 558/270

[56] References Cited

U.S. PATENT DOCUMENTS

| Re. 31,715 | 10/1984 | Coates et al. | 252/299.65 |
| 4,002,670 | 1/1977 | Steinstrasser | 252/299.64 |
| 4,009,934 | 3/1977 | Goodwin et al. | 252/299.64 |
| 4,065,489 | 12/1977 | Steinstrasser et al. | 252/299.65 |
| 4,073,742 | 2/1978 | Erdmann et al. | 252/299.65 |
| 4,113,647 | 9/1978 | Coates et al. | 252/299.63 |
| 4,229,315 | 10/1980 | Krause et al. | 252/299.60 |
| 4,237,026 | 12/1980 | Eidenschink et al. | 252/299.63 |
| 4,257,911 | 3/1981 | Gray et al. | 252/299.65 |
| 4,400,293 | 8/1983 | Romer et al. | 252/299.63 |
| 4,415,470 | 11/1983 | Eidenschink et al. | 252/299.63 |
| 4,542,230 | 9/1985 | Gray et al. | 252/299.67 |
| 4,551,280 | 11/1985 | Sasaki et al. | 252/199.63 |
| 4,596,667 | 6/1986 | Imukai et al. | 252/299.63 |
| 4,602,851 | 7/1986 | Jenner et al. | 252/299.63 |
| 4,613,209 | 9/1986 | Goodby et al. | 252/299.66 |
| 4,621,901 | 11/1986 | Petrzilka et al. | 252/299.65 |
| 4,622,165 | 11/1986 | Kand et al. | 252/299.65 |
| 4,647,398 | 3/1987 | Saito et al. | 252/299.67 |
| 4,728,458 | 3/1988 | Higuchi et al. | 252/299.6 |

FOREIGN PATENT DOCUMENTS

| 153826 | 9/1985 | European Pat. Off. | 252/299.65 |
| 188222 | 7/1986 | European Pat. Off. | 252/299.65 |
| 191600 | 8/1986 | European Pat. Off. | 252/299.67 |

(List continued on next page.)

OTHER PUBLICATIONS

McDonnell, D. G., et al. Mol. Cryst. Liq. Cryst., vol. 123, pp. 169–177 (Feb. 1985).
Grat, C. W., et al., Mol. Cryst. Liq. Cryst., vol. 67, No. 1–4, pp. 1–24 (1981).

Primary Examiner—Teddy S. Gron
Attorney, Agent, or Firm—Stevens, Davis, Miller & Moser

[57] ABSTRACT

Biphenyl esters of formula (I), wherein formula (II) represents formula (III) or formula (IV), $R_1$ represents $C_3$–$C_{12}$ alkyl, alkoxy, alkylcarbonyloxy, alkoxycarbonyl or alkoxycarbonyloxy, j is 0 or 1, $R_2$ represents $C_3$–$C_{12}$ alkyl or alkoxy, one of $Q_1$ or $Q_2$ is fluorine and the other is hydrogen, provided that when j is 0 and formula (II) is formula (III) and both $R_1$ and $R_2$ are n-alkyl, then the total number of carbon atoms in $R_1$ and $R_2$ is more than 12. These compounds may be used as constituents of liquid crystal mixtures which show a room temperature ferroelectric smectic phase, and a number of such mixtures are described.

13 Claims, 3 Drawing Sheets

FOREIGN PATENT DOCUMENTS

| | | | |
|---|---|---|---|
| 2939782 | 4/1981 | Fed. Rep. of Germany | 252/299.64 |
| 56-65845 | 6/1981 | Japan | 252/299.65 |
| 58-126839 | 7/1983 | Japan | 252/299.63 |
| 58-126840 | 7/1983 | Japan | 252/299.63 |
| 60-63275 | 4/1985 | Japan | 252/299.63 |
| 60-193947 | 10/1985 | Japan | 252/299.65 |
| 61-30558 | 2/1986 | Japan | 252/299.65 |
| 61-30559 | 2/1986 | Japan | 252/299.65 |
| 61-174294 | 8/1986 | Japan | 252/299.65 |
| 61-210056 | 9/1986 | Japan | 252/299.65 |
| 61-229842 | 10/1986 | Japan | 252/299.65 |
| 86/02375 | 4/1986 | World Int. Prop. O. | 252/299.63 |
| 2098987 | 12/1982 | United Kingdom | 252/299.64 |

BIPHENYL ESTERS AND LIQUID CRYSTAL MATERIALS AND DEVICES CONTAINING THEM

This invention relates to esters, and to liquid crystal materials and devices containing them. More specifically the invention relates to ferroelectric liquid crystals.

Ferroelectric behaviour is observed in liquid crystals which exhibit a chiral tilted smectic phase, eg the smectic C, F, G, H, I, J and K phases (hereinafter abbreviated to $S_c^*$ etc, the asterisk denoting chirality). The use of such liquid crystals in rapidly switched electro-optical devices, eg data processing and large screen displays, has been proposed, eg by N A Clark and S T Lagerwall, App Phys. Lett. 36, p 899 (1980), (Reference 1).

A number of properties are desirable in a liquid crystal material for use in such applications. In particular the material should exhibit its chiral tilted smectic phase over a large temperature range centred around its intended working temperature; the material should have a low viscosity (which is why the $S_c^*$ phase is preferred, being the most fluid); and the material should have a high spontaneous polarisation coefficient (Ps) in its chiral tilted smectic phase. Other desirable properties include chemical stability, transparency, and the appearance of an $S_A$ phase at a temperature above the chiral phase, to assist alignment of the molecules of the material with device substrates (as described below).

Although some single compounds exhibit chiral tilted smectic liquid crystal phases with many of the desirable properties mentioned above, it is more common for a ferroelectric liquid crystal material to consist essentially of a mixture of two components, each of which may themselves be single compounds or mixtures of compounds. In such a mixture, a first component, a "host" may be selected which exhibits a tilted but non-chiral smectic phase over a broad temperature range, and with this is mixed a second component, a "dopant" which is optically active (ie contains an asymmetrically substituted carbon atom) and which induces the tilted smectic phase exhibited by the mixture to be chiral, preferably with a high Ps. Alternatively, a host may itself exhibit a chiral smectic phase but with a small Ps, and the presence of the dopant may induce an increased Ps. The presence of the dopant may additionally improve other properties of the host, eg the melting point of the mixture will often be lower than that of any of the compounds it contains, if a eutectic mixture is formed.

Research is at present being carried out to identify compounds and mixtures of compounds which are suitable for use in "host-dopant" ferroelectric smectic liquid crystal materials. It is an object of the present invention to provide novel and improved compounds for use in such materials, primarily but not exclusively as hosts, and to provide novel and improved mixtures containing them.

According to the present invention in a first aspect, there is provide a novel compound for use in a liquid crystal mixture, the compound having the Formula IA below:

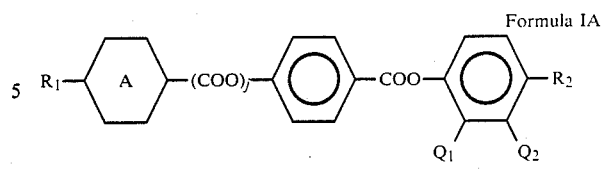

wherein

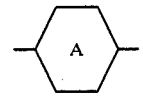

represents

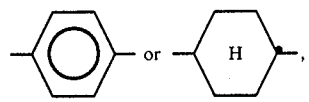

$R_1$ represents $C_{3-12}$ alkyl; alkoxy, alkylcarbonyloxy, alkoxycarbonyl or alkoxycarbonyloxy, j is 0 or 1, $R_2$ represents $C_{3-12}$ alkyl or alkoxy, one of $Q_1$ or $Q_2$ is H and the other F, provided that when j is 0 and

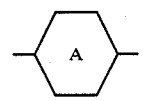

is

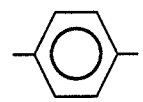

and both $R_1$ and $R_2$ are n-alkyl then the total number of carbon atoms in $R_1$ and $R_2$ is more than 12.

Compounds of Formula IA and certain related compounds have been found to be exceptionally useful components of liquid crystal mixtures as will be discussed herein.

According to the present invention in a second aspect, there is provided a novel liquid crystal material which exhibits at room temperature a smectic phase of a kind which in the presence of an optically active compound is a tilted chiral smectic phase, and which comprises a mixture of compounds at least one of which is of Formula I below:

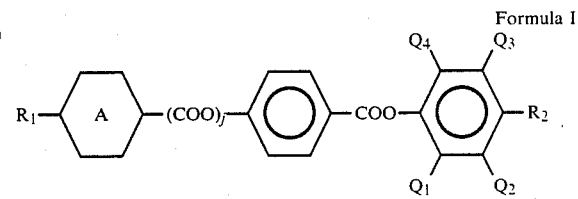

wherein represents

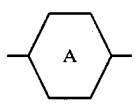

represents

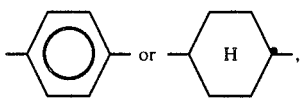

j is 0 or 1 $R_1$ represents alkyl, alkoxy, alkylcarbonyloxy, alkoxycarbonyl, or alkoxycarbonyloxy, each of $Q_1$, $Q_2$, $Q_3$ and $Q_4$ is F or H, at least one being F, and $R_2$ represents alkyl or alkoxy.

$R_1$ and $R_2$ preferably each contain 1 to 20 carbon atoms.

Preferably the compound of Formula I carries only one Fluorine substituent $Q_1$, $Q_2$, $Q_3$ or $Q_4$.

In this description:

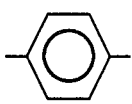

represents 1,4-linked phenyl.

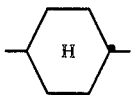

represents trans-1,4-linked cyclohexyl.

represents bicyclo-(2,2,2)octyl.

Preferred structural types for the compounds of Formula IA and I are listed in Table 1 below.

TABLE 1

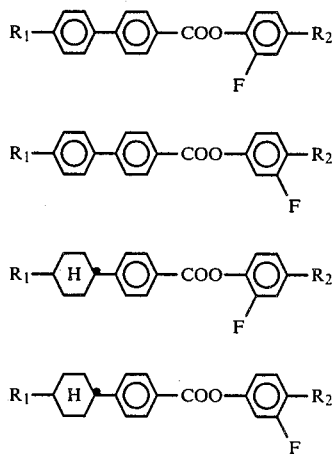

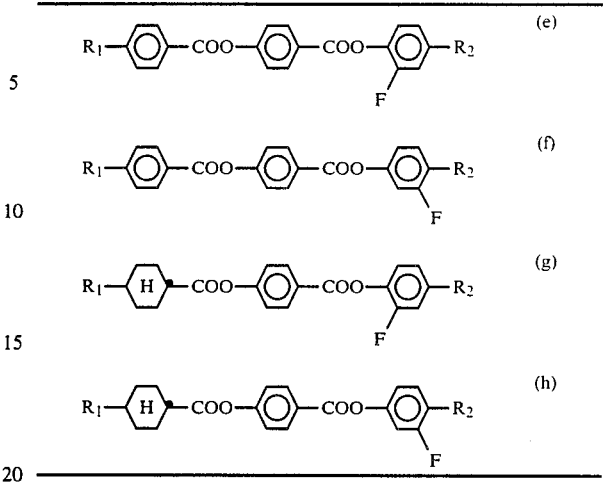

Of the structural types shown in Table I (a), (b), (e) and (f) are preferred for use in liquid crystal mixtures.

Preferably $R_1$ is $C_3$-$C_{12}$ n-alkyl, an optically active alkyl group, such as a group X of the formula $CH_3$—$CH_2$. $CH(CH_3)(CH_2)n$ where n is an integer 1 to 8 inclusive, $C_3$-$C_{12}$ n-alkoxy or an optically active alkoxy group, eg of the formula XO. A preferred group X is 2-methylbutyl.

Preferably $R_2$ is a $C_3$-$C_{12}$ n-alkyl group or an optically active group, eg X.

$R_1$ and $R_2$ may be the same or different.

Where $R_1$ and/or $R_2$ is an optically active group, then the compound of Formula I or IA may be either in an optically active form eg (+) or (−), or it may be in the form of a racemate (±), where (+) or (−) indicates the sign of the optical rotaton angle.

It has been found that liquid crystal materials which are mixtures containing one or more compounds of Formula I often exhibit smectic phases which are useful in ferroelectric liquid crystal devices, as mentioned above, and which persist over a wide temperature range which includes room temperature, eg around 15°–25° C.

When the compound or compounds of Formula I are optically active, eg if $R_1$ or $R_2$ is or contains (+)-2-methylbutyl, then tilted smectic phases exhibited by the compound(s) or mxitures containing them may be chiral tilted smectic phases, eg $S_c^*$.

In some cases compounds of Formula I lower the temperature at which smectic, eg Sc phases appear in compounds with which they are mixed.

Certain compounds of Formula I by themselves exhibit room temperature smectic phases, eg $S_c$, and their melting point, or the temperature at which smectic phases appear may be further reduced by the addition of other compounds, which may be compounds of Formula I.

Compounds of Formula I, or liquid crystal mixtures containing them may therefore be used as hosts, with which a dopant may be mixed to make them suitable, or to improve their suitability, for use as ferroelectric liquid crystal materials. If the compound of Formula I, or a liquid crystal mixture containing one or more compounds of Formula I exhibits a tilted but non-chiral smectic phase, then a dopant comprising one or more optically active compounds may be mixed with it to produce a chiral tilted smectic phase in the mixture, preferably with a high Ps. Alternatively or additionally, if the compound of Formula I or a liquid crystal mixture containing one or more compounds of Formula I exhibits a chiral tilted smectic phase, then a dopant may be mixed with it to induce a high Ps.

Such a liquid crystal mixture, containing one or more compounds of Formula I and optionally containing one or more optically active compounds, and exhibiting a chiral tilted smectic phase, constitutes another aspect of the invention.

A number of types of compound are known which function as dopants in hosts which are or contain compounds of Formula I. Among these are:

(i) Derivatives of α-hydroxycarboxylic acids, particularly of lactic acid, as described in PCT Application No. PCT/GB85/00512 for example the compound:

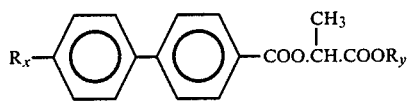

(ii) Derivatives of α-amino acids, as described in UK Patent Applications No. 8520714 and 8524879, for example the compound:

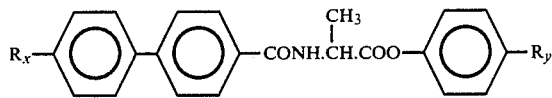

(iii) Various secondary alcohol deriviates, particularly those of 2-octanol, as described for example in UK Patent Application No. 8520715, eg the compound:

(iv) Derivatives of optically active terpenoids, eg those described in UK Patent Application No. 8501999, for example the compound:

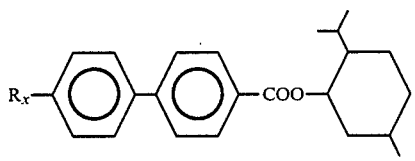

(v) Compounds containing other optically active (+ or −) alkyl groups, eg as esters or as alkyl- or alkoxyphenyl groups, 2-methylbutyl is preferred, but others such as 3-methylpentyl, 4-methylhexyl or 5-methylpentyl are also suitable. An example of such a compound is one of the formula:

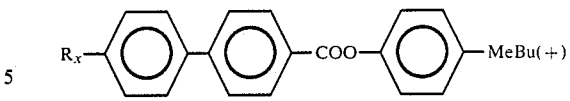

or a compound of Formula I in which $R_1$ or $R_2$ is such an optically active alkyl group.

In compounds (i) to (v) above $R_x$ is $C_5$-$C_{12}$ n-alkyl or n-alkoxy and $R_y$ is $C_1$-$C_5$ n-alkyl.

The compounds (i) to (v) above all contain asymmetric carbon atoms and may be prepared in an optically active form as described in the patent applications referred to. In their optically active form, when mixed as dopants with a compound of Formula I or a mixture containing a compound of Formula I, which exhibits a tilted smectic phase, compounds (i) to (v) above are effective at inducing a high Ps.

In general when a dopant is mixed with a compound of Formula I or a mixture containing a compound of Formula I to induce a high Ps, the value of Ps induced is proportional to the amount of dopant present in the mixture. It is usually desirable to have as high a Ps as possible in a liquid crystal material for use in a ferroelectric liquid crystal device, provided other desirable properties such as viscosity, working temperature range etc are not compromised. Measurement of Ps (several methods are known) therefore provides an indication of the usefulness of a compound of Formula I in a liquid crystal mixture.

A liquid crystal mixture according to the invention may also contain one or more additive(s) to improve or modify other properties of the mixture for a particular application, such as viscosity, dielectric anisotropy, birefringerence, chiral pitch, elastic constants, melting point, clearing point etc.

In the field of smectic liquid crystal chemistry relatively little is known about the structural requirements for miscibility, and it is therefore difficult to predict which compounds will form stable mixtures which exhibit stable smectic phases. In selecting a dopant or additive it may thus sometimes be advisable to carry out relatively simple experiments to investigate miscibility and the appearance or otherwise of smectic phases at useful temperatures.

There are some signs that compounds which have the same or a closely related "molecular core" ie combination of phenyl or cyclohexyl groups and linking groups will be miscible as liquid crystal compounds. As will be demonstrated by the examples given herein however, this rule is not rigid, and the compounds of Formula I are miscible with an unusually wide range of structural types of compounds.

Some possible examples of additives are given in Tables 2, 3 and 4 below, but it must be understood that this is only a general guide and experiments as suggested above to investigate suitability should be carried out.

Examples of the families of compounds which may be added to a mixture containing a compound of the invention together with one or more of the tilted smectic compounds or materials such as (a) to (e) described above to produce a room temperature smectic C phase are shown in Table 2.

TABLE 2

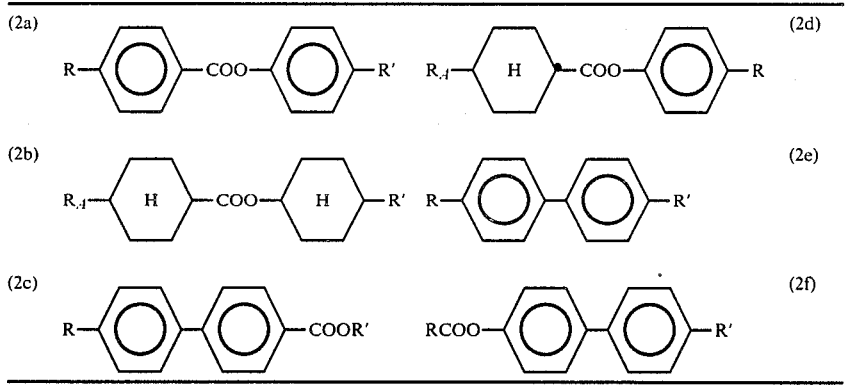

where R and R' are alkyl or alkoxy and $R_A$ is alkyl. Preferably R is $C_{5-12}$ n-alkyl or n-alkoxy or $C_{5-12}$ branched alkyl or alkoxy containing an asymmetrically substituted carbon atom eg 2-methylbutyl.

Examples of low melting and/or low viscosity additives are the compounds shown in Table 3.

where each R is independently alkyl or alkoxy, eg $C_{1-18}$ n-alkyl or n-alkoxy, and each $R_A$ is independently alkyl, eg $C_{1-18}$ n-alkyl.

Examples of high clearing point additives are the compounds shown in Table 4.

TABLE 3

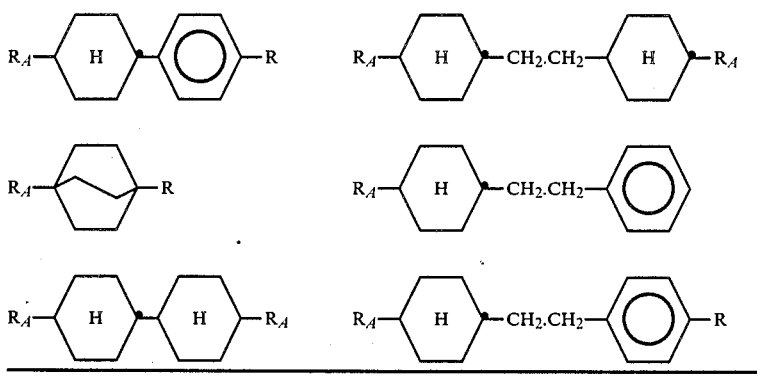

TABLE 4

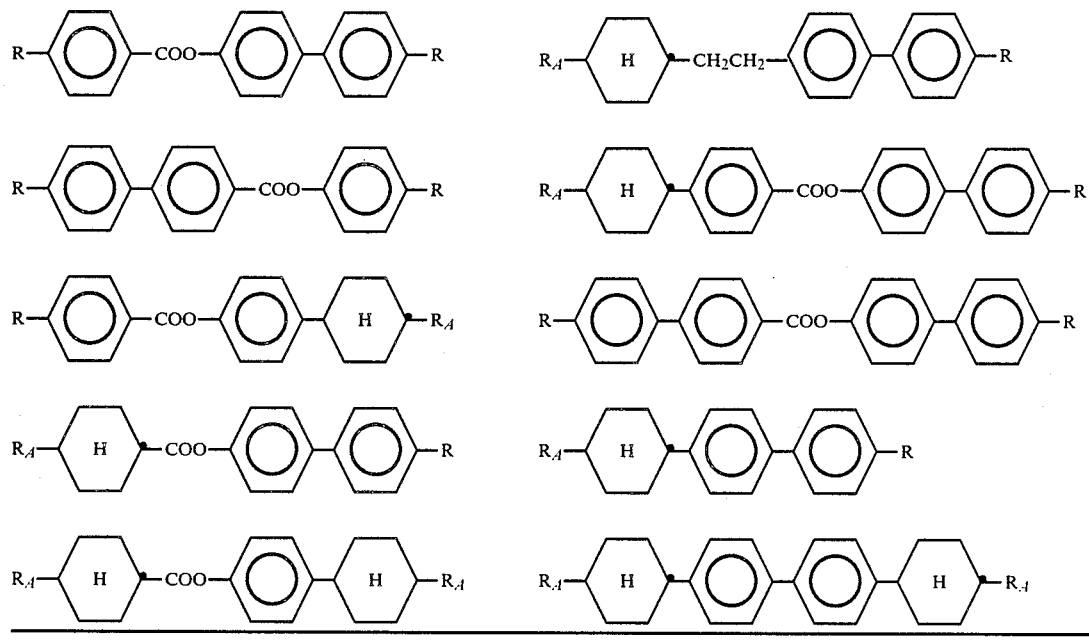

where R is alkyl or alkoxy, eg $C_{1-12}$ alkyl or alkoxy and $R_A$ is alkyl, eg $C_{1-12}$ or a fluorinated analogue of one of these compounds.

An example of a mixture according to the invention containing a dopant are various of the additives of Tables 2, 3 and 4 above is:

| Component | Wt % |
|---|---|
| One or more components of Formula I (host) | 25 to 75 |
| Dopant, eg one or more of compounds (i) to (v) | 5 to 50 |
| One or more compounds of Table 2 | 25 to 75 |
| One or more compounds of Formula 2a in Table 2 | 5 to 25 |
| One or more compounds of Table 3 or 4 (total) | 0 to 30 |

The sum of the weight percentages in the mixture being 100%.

As discussed above, any of the host, dopant or other additives may be optically active, causing the tilted smectic phase exhibited by the mixture to be chiral. If two or more of the components of such a mixture are optically active then the helical twist sense of the chiral phase induced in the mixture by the optically active components may be the same or opposed. If the twist senses are opposed, then the pitch of the chiral phase induced in the mixture will be greater than if the two senses are the same, and the sense of the chiral twist will be that induced by the component which induces the smaller pitch, ie that with greater twisting power. It is thus possible to adjust the pitch of a mixture according to the invention by appropriate selection of chiral components, and if two chiral components of equal but opposite twisting power are included in the mixture, then a mixture with an infinite pitch may be obtained.

Chiral smectic liquid crystal materials containing compounds of Formula I may be used in known electro-optic devices which exploit the ferroelectric properties of the S* mesophase.

An example of such a device is the "Clark Lagerwall Device", described in Reference 1, and also in "Recent Developments in Condensed Matter Physics" 4, p309, (1981) (Reference 3). The physics of this device, and methods of constructing one are well known. In practice such a device usually consists of two substrates, at least one of which is optically transparent, electrodes on the inner surfaces of the substrates and a layer of the liquid crystal material sandwiched between the substrates.

The Clark Lagerwall device uses a layer of liquid crystal material between the substrates of a thickness comparable to or less than the helical pitch of the S* configuration, which causes the helix to be unwound by surface interactions. In its unwound state the material has two surface stabilised states with director orientations (ie molecular tilt direction) at twice the tilt angle to one another, and also permanent dipole orientations perpendicular to the substrates but in opposite directions.

An alternative approach to providing cells for a Clark-Lagerwall device hving a thicker layer of liquid crystal material is to use an applied electric field to induce homogeneous alignment through interaction with the dielectric anistropy of the liquid crystal material. This effect requires a chiral smectic material having a negative dielectric anisotropy, eg provided by incorporation of a compound having a lateral halogen or cyano substituent. Such a compound may itself be chiral or non-chiral and smectic or non-smectic.

In general chiral smectic C materials ($S_C^*$) are used in these displays because these are the most fluid, but in principle the more ordered chiral smectics could also be used. A pleochroic dye may also be incorporated in the liquid crystal material to enhance the electro-optic effect.

Such a device incorporating compounds of Formula I offers the possibility of a high switching speed of a few microseconds—as demonstrated in Reference 3—together with bistable storage capability; and so is likely to have important applications in displays, optical processing devices, and optical storage devices.

According to the present invention in a further aspect, there is provided an electro-optical device, operating by a ferroelectric effect in a liquid crystal material, wherein the liquid crystal material is a mixture of compounds at least one of which is a compound of Formula I.

The device may, for example, be a Clark-Lagerwall device as described above, and may comprise two substrates at least one of which is optically transparent, electrodes on the inner surfaces of the substrates, and a layer of the liquid crystal material sandwiched between the substrates.

The liquid crystal mixtures incorporating a compound of Formula I and a dopant which induces a high Ps as described herein are especially suited for use in rapidly switched large screen (eg A4 size) displays, such as are used in portable computers, desk top calculators and visual display units, and by using appropriately shaped substrates and electrodes the electro-optical device of the invention may be made in this form.

Compounds of Formula I and IA may be prepared from the appropriate fluorophenol and carboxylic acid (which may in many cases be commercially available) by for example the following routes, in which (F) indicates that one or more fluoro-substituents is present.

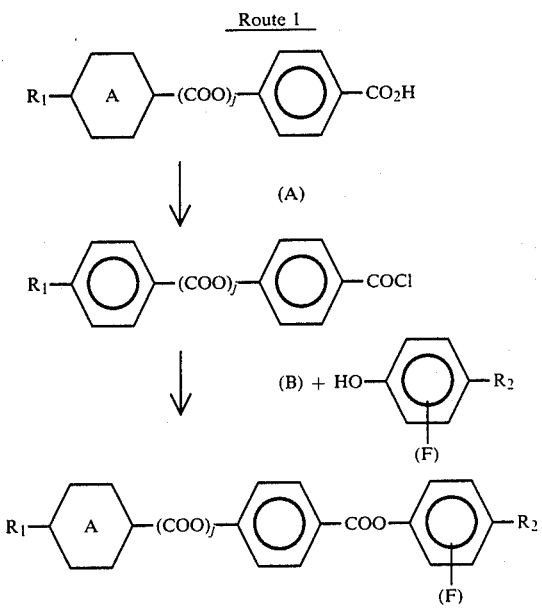

(A) Thionyl chloride, reflux (B) Presence of base, eg triethylamine, dichloromethane solvent.

Note: The acids used in Step A are known and are either commercially available or may be obtained by simple hydrolysis from the corresponding nitriles eg of formula

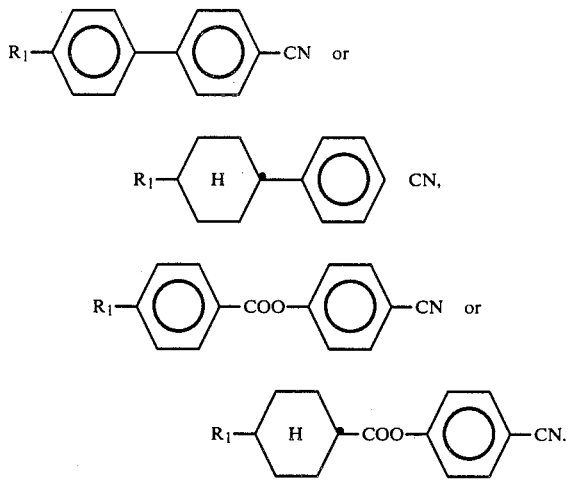

The starting fluoro-phenols for step B are known, eg from UK Patent Specification No. GB 2058789A.

Route 2

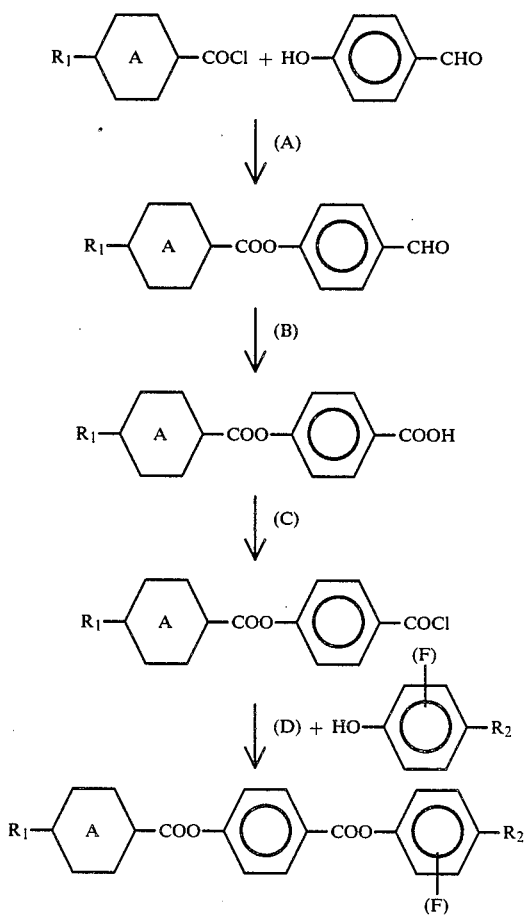

(A) Base, dichloromethane solvent.
(B) $CrO_3$, acetic acid solvent.
(C) Thionyl chloride.
(D) Base, dichloromethane solvent.

Examples of the preparation and properties of compounds of Formula IA and I, and of liquid crystal mixtures and a device containing them will now be given.

In this description the abbreviations below are used:
K=crystalline solid
$S_A$=smectic A, (other smectic phases denoted analagously eg $S_C$, $S_B$ etc)
S*=chiral smectic
Ch=cholesteric (chiral nematic)
N=nematic
I=isotropic liquid
K—N=T=crystal to nematic transition at temperature T°C. (other transitions denoted analagously, eg $S_C$-$S_A$=100). Bracketed transition temperatures, ie (T) indicate virtual transitions.
Ps=spontaneous polarisation $nCcm^{-2}$.
(+)-MeBu=(+)-2-methylbutyl. Optical Activity indicated eg (+).
(±)-MeBu=(±)-2-methylbutyl, racemic.

EXAMPLE 1

The preparation of 2-fluoro-4-pentylphenyl 4'-octylbiphenylyl carboxylate (Route 1)

Step A1

The starting materials were 4'-octylbiphenylylcarboxylic acid and thionyl chloride, 20 mls.

The biphenylcarboxylic acid (10 gram 32 m moles) and thionyl chloride (20 mls) were heated under reflux for 1 hour after which time the excess thionyl chloride was removed by distillation, finally under reduced pressure. A light orange crystalline crude product was obtained.

Step B1

To a solution of 2-fluoro-4-pentylphenol (32 mmoles 5.87 gram) in dichloromethane (30 mls) and triethylamine (20 mls) under anhydrous conditions was added a solution of the acid chloride (prepared as in Step 1a) (10.6 gram, 32 mmoles) in dichloromethane (20 mls) over 5 minutes. The resulting mixture was heated under reflux for 1½ hours and then cooled to room temperature (25° C.).

The mixture was added to a 10% hydrochloric acid solution (100 ml) and then washed with water (2×100 ml). The organic phase was dried over sodium sulphate, filtered and the solvent evaporated to dryness to give a crude yield of 14.8 gram (97%).

The crude material was taken up in a mixture of petroleum spirit of boiling point 60°–80° C. and dichloromethane (2:1 parts by volume; 120 ml) passed through a chromatographic column comprising basic alumina (30 gram) over a silica gel (30 gram). The product was eluted with petroleum spirit/dichloromethane (2:1 parts by volume; 150 ml) to give after evaporation a white solid (90 g). Recrystallisation from industrial methylated spirits/acetone mixture (10:1 parts by volume; 100 mls) gave 8.4 gram product.

The purity measured by gas liquid chromatography was found to be 99.8%. The yield was found to be 55%.

Alkoxy analogues are prepared using the corresponding 4'-alkoxy biphenylcarboxylic acids in step A1.

The following Table, Table 6 summarises examples of compounds which are made in an analogous way.

TABLE 6

Compounds of the formula:

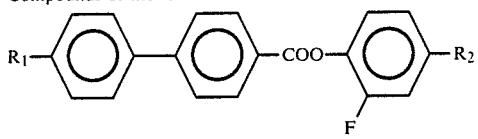

| R₁ | R₂ |
|---|---|
| n-$C_3H_7$ | |
| n-$C_4H_9$ | |
| n-$C_5H_{11}$ | |
| (+)-2-methylbutyl | |
| (±)-2-methylbutyl | |
| n-$C_6H_{13}$ | |
| n-$C_7H_{15}$ | |
| n-$C_8H_{17}$ | n-$C_mH_{2m+1}$ all values of m from 3 to 12 inclusive excluding n-$C_5H_{11}$ when $R_1$ = n-$C_8H_{17}$ (described above) or (+)-2-methylbutyl or (±)-2-methylbutyl |
| n-$C_9H_{19}$ | |
| n-$C_{10}H_{21}$ | |
| n-$C_{12}H_{25}$ | |
| n-$C_3H_7O$ | |
| n-$C_4H_9O$ | |
| n-$C_5H_{11}O$ | |
| (+)-2-methylbutoxy | |
| (±)-2-methylbutoxy | |
| n-$C_6H_{13}O$ | |
| n-$C_7H_{15}O$ | |
| n-$C_8H_{17}O$ | |
| n-$C_9H_{19}O$ | |
| n-$C_{10}H_{21}O$ | |
| n-$C_{11}H_{23}O$ | |
| n-$C_{12}H_{25}O$ | |

EXAMPLE 2

3-fluorphenyl esters of the formula

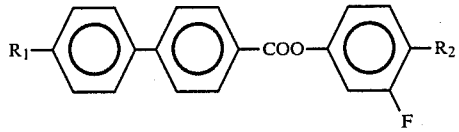

were made in a manner analogous to Example 1 using the appropriate 3-fluoro-4-alkylphenol as starting material in Step A. The following Table, Table 7 summarises examples of compounds which may be made in this way.

TABLE 7

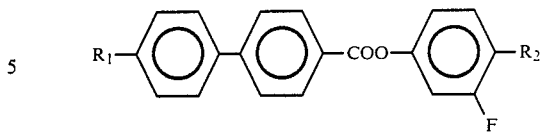

| R₁ | R₂ |
|---|---|
| n-$C_3H_7$ | |
| n-$C_4H_9$ | |
| n-$C_5H_{11}$ | |
| (+)-2-methylbutyl | |
| (±)-2-methylbutyl | |
| n-$C_6H_{13}$ | |
| n-$C_7H_{15}$ | |

TABLE 7-continued

| R₁ | R₂ |
|---|---|
| n-$C_8H_{17}$ | |
| n-$C_9H_{19}$ | |
| n-$C_{10}H_{21}$ | |
| n-$C_{12}H_{25}$ | |
| n-$C_3H_7O$ | |
| n-$C_4H_9O$ | |
| n-$C_5H_{11}O$ | n-$C_mH_{2m+1}$ all values of m from 3 to 12 inclusive or (+)-2-methylbutyl or (±)-2-methylbutyl |
| (+)-2-methoxybutoxy | |
| (±)-2-methylbutoxy | |
| n-$C_6H_{13}O$ | |
| n-$C_7H_{15}O$ | |
| n-$C_8H_{17}O$ | |
| n-$C_9H_{19}O$ | |
| n-$C_{10}H_{21}O$ | |
| n-$C_{11}H_{23}O$ | |
| n-$C_{12}H_{25}O$ | |

EXAMPLE 3

Phenylcyclohexyl derivatives of the formula

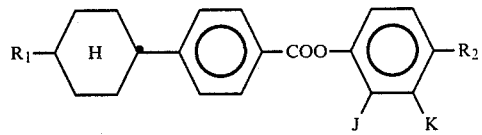

where one of J and K is H and the other is F, were made in a manner analogous to Example 1 using the appropriate trans-4-(4'-alkyl or -alkoxy cyclohexyl) benzoic acid and 2-fluoro-4-alkylphenol or 3-fluoro-4-alkylphenol as starting material.

The following Table, Table 8, summarises examples of compounds which may be prepared in the same way.

TABLE 8

Compounds of formula:

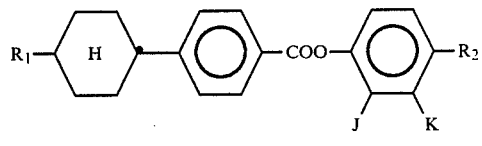

| R₁ | R₂ | J | K |
|---|---|---|---|
| n-$C_3H_7$ | | H | F |
| n-$C_4H_9$ | | H | F |
| n-$C_5H_{11}$ | | H | F |
| (+)-2-methyl-butyl | | H | F |
| (±)-2-methyl-butyl | | H | F |
| n-$C_6H_{13}$ | | H | F |
| n-$C_7H_{15}$ | | H | F |
| n-$C_8H_{17}$ | n-$C_mH_{2m+1}$ all values of m from 3 to 12 inclusive excluding n-$C_5H_{11}$ when $R_1$ = n-$C_8H_{17}$) or (+)-2-methylbutyl or (±)-2-methylbutyl | H | F |
| n-$C_9H_{19}$ | | H | F |
| n-$C_{10}H_{21}$ | | H | F |
| n-$C_{12}H_{25}$ | | H | F |
| n-$C_3H_7O$ | | H | F |
| n-$C_4H_9O$ | | H | F |

TABLE 8-continued

Compounds of formula:

R₁—⟨H⟩—⟨◯⟩—COO—⟨◯⟩—R₂  (with J, K substituents)

| R₁ | R₂ | | J | K |
|---|---|---|---|---|
| n-C₅H₁₁O | | | H | F |
| (+)-2-methyl-butoxy | | | H | F |
| (±)-2-methyl-butoxy | | | H | F |
| n-C₆H₁₃O | | | H | F |
| n-C₇H₁₅O | | | H | F |
| n-C₈H₁₇O | | | H | F |
| n-C₉H₁₉O | | | H | F |
| n-C₁₀H₂₁O | | | H | F |
| n-C₁₁H₂₃O | | | H | F |
| n-C₁₂H₂₅O | | | H | F |
| n-C₃H₇ | | | F | H |
| n-C₄H₉ | | | F | H |
| n-C₅H₁₁ | | | F | H |
| (+)-2-methyl-butyl | | | F | H |
| (±)-2-methyl-butyl | | | F | H |
| n-C₆H₁₃ | | | F | H |
| n-C₇H₁₅ | | | F | H |
| n-C₈H₁₇ | | n-C$_m$H$_{2m+1}$ all values of m from 3 to 12 inclusive excluding n-C₅H₁₁ when R₁ = n-C₈H₁₇ or (+)-2-methylbutyl or (±)-2-methylbutyl | F | H |
| n-C₉H₁₉ | | | F | H |
| n-C₁₀H₂₁ | | | F | H |
| n-C₁₂H₂₅ | | | F | H |
| n-C₃H₇O | | | F | H |
| n-C₄H₉O | | | F | H |
| n-C₅H₁₁O | | | F | H |
| (+)-2-methyl-butoxy | | | F | H |
| (±)-2-methyl-butoxy | | | F | H |
| n-C₆H₁₃O | | | F | H |
| n-C₇H₁₅O | | | F | H |
| n-C₈H₁₇O | | | F | H |
| n-C₉H₁₉O | | | F | H |
| n-C₁₀H₂₁O | | | F | H |
| n-C₁₁H₂₃O | | | F | H |
| n-C₁₂H₂₅O | | | F | H |

The following tables, Tables 9, 10, 11, 12 give the transition temperatures of various compounds of Formula IA and I.

TABLE 9

Compounds of the Formula:

$R_C$—⟨◯⟩—⟨◯⟩—COO—⟨◯⟩—$R_D$  (with F substituent)

| $R_C$ | $R_D$ | Transition temperatures (°C.) |
|---|---|---|
| n-C₅H₁₁ | n-C₃H₇ | K—N = 70.5; N—I = 159 |
| n-C₅H₁₁ | n-C₅H₁₁ | K—N = 68; N—I = 153 |
| n-C₇H₁₅ | n-C₅H₁₁ | K—S$_c$ = 62; S$_c$—N = 65.5; N—I = 142.3 |
| n-C₇H₁₅ | 2MeBu (+) | K—S$_B$ = 53.5; S$_B$—S$_c$ = 64; S—Ch = 68; Ch—I = 122 |
| n-C₈H₁₇ | n-C₅H₁₁ | K—S$_B$ = 64; S$_B$—S$_c$ = (35); S$_c$—S$_A$ = 76; S$_A$—N = 91; N—I = 137 |
| 2MeBu (+) | n-C₅H₁₁ | K—Ch = 46.5; Ch—I = 118 |
| 2MeBu (+) | n-C₇H₁₅ | K—Ch = 50.5; Ch—I = 110 |
| n-C₅H₁₁ | n-C₆H₁₃ | K—N = 55.5; N—I = 142 |
| n-C₅H₁₁ | n-C₁₀H₂₁ | K—N = 62.5; N—I = 130.2 |
| n-C₁₀H₂₁ | n-C₈H₁₇ | K—S$_B$ = 63.2; S$_B$—S$_c$ = (54.2); S$_c$—S$_A$ = 100.6; S$_A$—N = 112.1; N—I = 122.3 |
| n-C₁₀H₂₁ | n-C₁₀H₂₁ | K—S$_B$ = 65.7; S$_B$—S$_c$ = (52); S$_c$—S$_A$ = 102; S$_A$—N = 112.8; N—I = 119.4 |
| n-C₅H₁₁ | 2MeBu | K—S$_A$ = 57; S$_A$—Ch = (50); Ch—I = 132.4 |
| n-C₅H₁₁ | n-C₈H₁₇ | K—N = 60; N—I = 135.4 |

TABLE 10

Compounds of Formula:

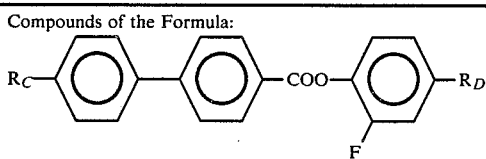

$R_CO$—⟨◯⟩—⟨◯⟩—COO—⟨◯⟩—$R_D$  (with F substituent)

| $R_CO$ | $R_D$ | Transition temperature (°C.) |
|---|---|---|
| n-C₈H₁₇O | n-C₅H₁₁ | K—S$_c$ = 47; S$_B$—S$_c$ = (30); S$_c$—S$_A$ = 127; S$_A$—N = 133.5; N—I = 160° C. |
| n-C₈H₁₇O | n-C₇H₁₅ | K—S$_c$ = 48; S$_B$—S$_c$ = (29); S$_c$—S$_A$ = 122; S$_A$—N = 128 |
| n-C₈H₁₇O | 2MeBu (+) | K—S$_B$ = 57; S$_c$—Ch = 108; Ch—I = 151 |
| n-C₉H₁₉O | n-C₆H₁₃ | K—S$_B$ = 56; S$_B$—S$_c$ = 59; S$_c$—S$_A$ = 128; S$_A$—N = 136; N—I = 156 |
| n-C₉H₁₉O | n-C₁₀H₂₁ | K—S$_B$ = 58; S$_B$—S$_c$ = 63; S$_c$—S$_A$ = 130.4; S$_A$—N = 137.4; N—I = 146.3 |
| n-C₇H₁₅O | n-C₅H₁₁ | K—S$_c$ = 54; S$_c$—N = 109.5; N—I = 168 |
| n-C₇H₁₅O | n-C₇H₁₅ | K—S$_B$ = 41; S$_c$—S$_A$ = 119; S$_A$—N = 120.5; N—I = 160 |
| n-C₈H₁₇O | 2MeBu (±) | K—S$_B$ = 49; S$_c$—S$_A$ = 106.5; S$_A$—N = 111.0; N—I = 149 |
| n-C₇H₁₅O | 2MeBu (+) | K—S$_C$ = 61; S$_c$—Ch = 98; Ch—I = 150.5 |
| 2MeBu O (+) | C₈H₁₇ | K—S$_c$ = 55.5; S$_c$—Ch = 45.5; Ch—N = 121.7 |

TABLE 11

Compounds of Formula:

R₁—⟨◯⟩—⟨◯⟩—COO—⟨◯⟩—R₂  (with F substituent)

| R₁ | R₂ | Transition Temperatures (°C.) |
|---|---|---|
| n-C₈H₁₇O | n-C₃H₇ | K—S$_c$ = 82° C.; S$_c$—S$_A$ = 102° C. S$_A$—I = 189° C. |
| (+)-2-methylbutyl | n-C₃H₇ | K—S$_A$ = 78° C.; S$_A$—Ch = 81.5° C. Ch—I = 120.2° C. |

TABLE 12

Compounds of Formula

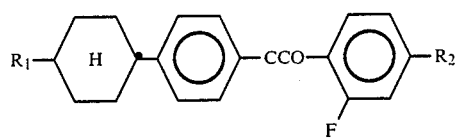

| $R_1$ | $R_2$ | Transition Temperatures (°C.) |
|---|---|---|
| n-$C_7H_{15}$ | n-$C_5H_{11}$ | K—$S_A$ = 62° C.; $S_A$—N = 64° C.; N—I = 147.5° C. |

EXAMPLE 4

The preparation of 2-Fluoro-4-n-pentylphenyl 4-(4-n-dodecoxybenzoyloxy)benzoate (Route 2)

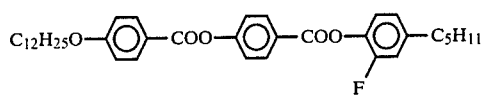

Step A4

4-n-Dodecoxybenzoyl chloride (15.9 g) was added to 4-hydroxybenzaldehyde (6.0 g) dissovled in dichloromethane (50 ml) and triethylamine (14 ml). The mixture was refluxed for 1 hour and then added to water (100 ml). The organic layer was washed with 10% hydrochloric acid (75 ml) and water (75 ml), dried over anhydrous sodium sulphate and the solvent was then evaporated.

Step B4

The 4-(4-n-dodecoxybenzoyloxy)-benzaldehyde produced in step A4 (17.4 g) was dissolved in acetic acid (60 ml) and treated with a solution of chromium trioxide (12.7 g) dissolved in 50% acetic acid added dropwise over 20 minutes at 40° C. After stirring at 45°–50° for 20 hours, water (150 ml) was added and the mixture stirred for 3 hours. The product separated and was recrystallised from acetic acid (55 ml) to give 4-(4-n-dodecoxybenzoyloxy)-benzoic acid (15 g, 83% theory).

Step C4

The acid produced in step B4 (6.0 g) was converted to the acid chloride by refluxing with thionyl chloride (20 ml) for 1 hr, after which excess thionyl chloride was evaporated off.

Step D4

The product of step C4 was added to a solution of 2-fluoro-4-n-pentylphenol (2.56 g) and triethylamine (6 ml) in dichloromethane (40 ml). After refluxing for 1 hour, the solution was washed successively with water (75 ml), 10% hydrochloric acid (75 ml), and water (75 ml). Evaporation of the solvent gave the crude product which was purified by chromatography over silica gel (7 g) and alumina (14 g). Elution with a 2:1 mxiture of petroleum spirit (60°–80° C.) and dichloromethane gave a white solid (5.9 g) which was recrystallised from petroleum spirit (bp 60°–80°) to give 4.0 g (48% theory) 2-fluoro-4-n-pentylphenyl 4-(4-n-dodecoxybenzoyloxy)-benzoate. K-$S_c$=72, $S_c$-N=113.6, N-I=154.2.

The following table, Table 13, summrises examples of compounds which are made in an andogous way.

TABLE 13

Compounds of the formula

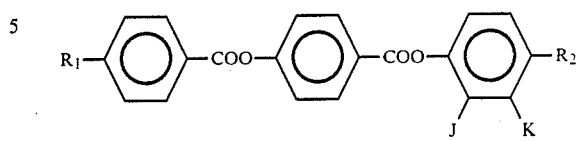

| $R_1$ | $R_2$ | J | K |
|---|---|---|---|
| n-$C_3H_7$ | n-$C_mH_{2m+1}$ all values of m from 3 to 12 inclusive or (+)-2-methylbutyl or (±)-2-methylbutyl | H | F |
| n-$C_4H_9$ | | H | F |
| n-$C_5H_{11}$ | | H | F |
| (+)-2-methylbutyl | | H | F |
| (±)-2-methylbutyl | | H | F |
| n-$C_6H_{13}$ | | H | F |
| n-$C_7H_{15}$ | | H | F |
| n-$C_8H_{17}$ | | H | F |
| n-$C_9H_{19}$ | | H | F |
| n-$C_{10}H_{21}$ | | H | F |
| n-$C_{11}H_{23}$ | | H | F |
| n-$C_{12}H_{25}$ | | H | F |
| n-$C_3H_7O$ | | H | F |
| n-$C_4H_9O$ | | H | F |
| n-$C_5H_{11}O$ | | H | F |
| (+)-2-methylbutoxy | | H | F |
| (±)-2-methylbutoxy | | H | F |
| n-$C_6H_{13}O$ | | H | F |
| n-$C_7H_{15}O$ | | H | F |
| n-$C_8H_{17}O$ | | H | F |
| n-$C_9H_{19}O$ | | H | F |
| n-$C_{10}H_{21}O$ | | H | F |
| n-$C_{11}H_{23}O$ | | H | F |
| n-$C_{12}H_{25}O$ | | H | F |
| n-$C_37$ | n-$C_mH_{2m+1}$ all values of m from 3 to 12 inclusive or (+)-2-methylbutyl or (±)-2-methylbutyl | F | H |
| $C_4H_9$ | | F | H |
| $C_5H_{11}$ | | F | H |
| (+)-2-methylbutyl | | F | H |
| (±)-2-methylbutyl | | F | H |
| n-$C_6H_{13}$ | | F | H |
| n-$C_7H_{15}$ | | F | H |
| n-$C_8H_{17}$ | | F | H |
| n-$C_9H_{19}$ | | F | H |
| n-$C_{10}H_{21}$ | | F | H |
| n-$C_{10}H_{23}$ | | F | H |
| n-$C_{12}H_{25}$ | | F | H |
| n-$C_3H_7O$ | | F | H |
| n-$C_4H_9O$ | | F | H |
| n-$C_5H_{11}O$ | | F | H |
| (+)-2-methylbutoxy | | F | H |
| (±)-2-methylbutoxy | | F | H |
| n-$C_6H_{13}O$ | | F | H |
| n-$C_7H_{15}O$ | | F | H |
| n-$C_8H_{17}O$ | | F | H |
| n-$C_9H_{19}O$ | | F | H |
| n-$C_{10}H_{21}O$ | | F | H |
| n-$C_{11}H_{23}O$ | | F | H |
| n-$C_{12}H_{25}O$ | | F | H |

EXAMPLE 5

The preparation of 2-Fluoro-4-n-pentyl 4-(4-n-pentyl-trans-cyclohexylcarbonyloxy)-benzoate (Route 2)

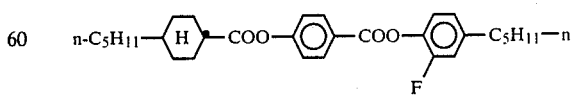

4-n-Pentyl-trans-cyclohexane carboxylic acid was converted into the acid chloride and reacted with 4-hydroxy benzaldehyde to form 4-(4-n-Pentyl-trans-cyclohexylcarbonyloxy)-benzoic acid as in steps A4 and B4 of Example 4.

The acid was then converted to the acid chloride using thionyl chloride and reacted with 2-fluoro-4-n-pentylphenol as described in steps C4 and D4 of Example 4.

The product was obtained in 60% yield, K-N=79, N-I=174.4.

The following table, Table 14 summarises examples of compounds which are made in an analogous way.

TABLE 14

Compounds of the formula:

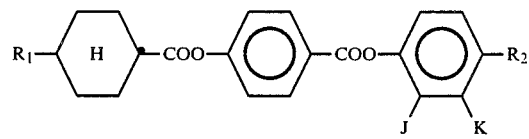

| $R_1$ | $R_2$ | J | K |
|---|---|---|---|
| n-$C_3H_7$ | n-$C_mH_{2m+1}$ all values of m | H | F |
| n-$C_4H_9$ | from 3 to 12 inclusive | H | F |
| n-$C_5H_{11}$ | (+)-2-methylbutyl or | H | F |
| (+)-2-methylbutyl | (±)-2-methylbutyl | H | F |
| (±)-2-methylbutyl | | H | F |
| n-$C_6H_{13}$ | | H | F |
| n-$C_7H_{15}$ | | H | F |
| n-$C_8H_{17}$ | | H | F |
| n-$C_9H_{19}$ | | H | F |
| n-$C_{10}H_{21}$ | | H | F |
| n-$C_{12}H_{25}$ | | H | F |
| n-$C_3H_7O$ | | H | F |
| n-$C_4H_9O$ | | H | F |
| n-$C_5H_{11}O$ | | H | F |
| (+)-2-methylbutoxy | | H | F |
| (±)-2-methylbutoxy | | H | F |
| n-$C_6H_{13}O$ | | H | F |
| n-$C_7H_{15}O$ | | H | F |
| n-$C_8H_{17}O$ | | H | F |
| n-$C_9H_{19}O$ | | H | F |
| n-$C_{10}H_{21}O$ | | H | F |
| n-$C_{11}H_{23}O$ | | H | F |
| n-$C_{12}H_{25}O$ | | H | F |
| n-$C_3H_7$ | | F | H |
| n-$C_4H_9$ | n-$C_mH_{2m+1}$ all values of m | F | H |
| n-$C_5H_{11}$ | from 3 to 12 inclusive or | F | H |
| (+)-2-methylbutyl | 5excluding n-$C_5H_{11}$ when | F | H |
| (±)-2-methylbutyl | $R_1$ = n-$C_8H_{17}$) or | F | H |
| n-$C_6H_{13}$ | (+)-2-methylbutyl or | F | H |
| n-$C_7H_{15}$ | (±)-2-methylbutyl | F | H |
| n-$C_8H_{17}$ | | F | H |
| n-$C_9H_{19}$ | | F | H |
| n-$C_{10}H_{21}$ | | F | H |
| n-$C_{10}H_{23}$ | | F | H |
| n-$C_{12}H_{25}$ | | F | H |
| n-$C_3H_7O$ | | F | H |
| n-$C_4H_9O$ | | F | H |
| n-$C_5H_{11}O$ | | F | H |
| (+)-2-methylbutoxy | | F | H |
| (±)-2-methylbutoxy | | F | H |
| n-$C_6H_{13}O$ | | F | H |
| n-$C_7H_{15}O$ | | F | H |
| n-$C_8H_{17}O$ | | F | H |
| n-$C_9H_{19}O$ | | F | H |
| n-$C_{10}H_{21}O$ | | F | H |
| n-$C_{11}H_{23}O$ | | F | H |
| n-$C_{12}H_{25}O$ | | F | H |

Examples of the use of the compounds of Formula I in materials and devices embodying the present invention will now be described by way of example with reference to the accompanying drawings, in which.

EXAMPLE 6

An example of the use of compounds of Formula I in the formulation of materials having a valuable room temperature smectic C phase with an overlying (higher temperature) smectic A phase is as follows:

The compound of formula (wherein $R_c$=2-methylbutyl):

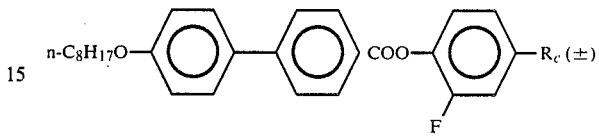

referred to herein as Compound 1 and the compound of formula

Figure 1:
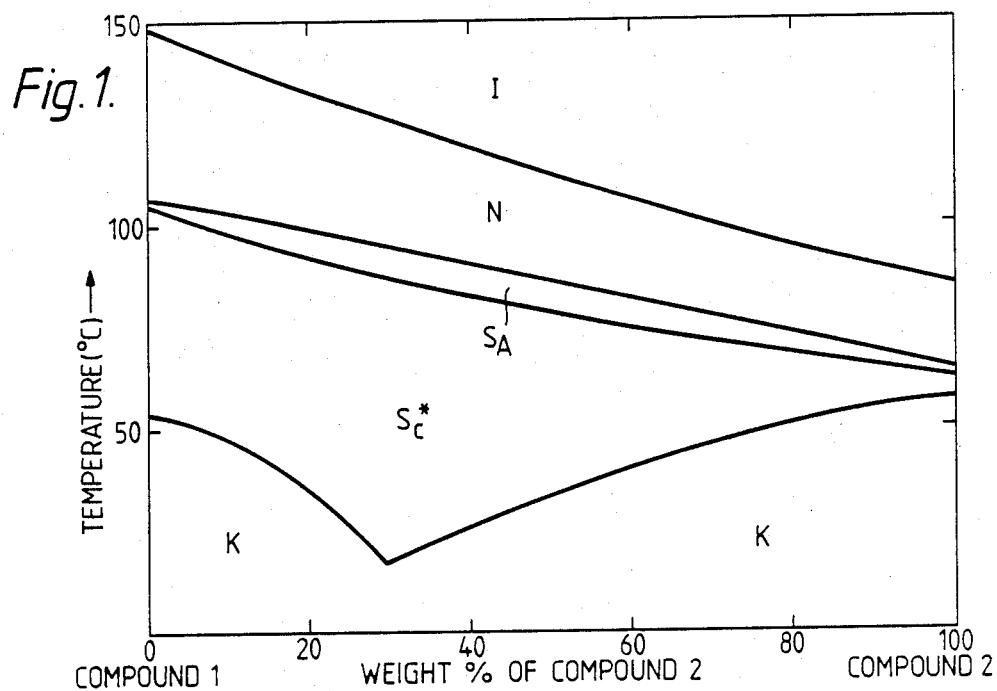
FIG. 1 is a graph of temperature against composition (ie the phase diagram) of the mixture of Example 6.

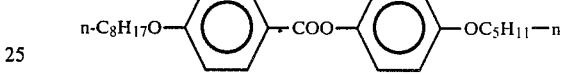

herein referred to as Compound 2; were mixed together and heated to form an isotropic liquid and then allowed to cool slowly. The transition temperatures between the various phases were noted by observing textural changes using an optical microscopic in a known way. FIG. 1 of the accompanying drawing shows the resultant phase diagram which was obtained, wherein I, N etc represent phases as defined above. As is seen in FIG. 1 at the composition comprising about 30% by weight of Compound 1 and 70% by weight of Compound 2 a long $S_c$ phase is obtained which extends from 20° C. to about 85° C. with a useful $S_A$ phase above. The $S_c$ phase is longer and at lower temperatures for this composition than for the individual components, Compounds 1 and 2 per se.

The lower end of the $S_c$ phase may be further depressed by the addition of other compounds, eg of Formula I. The $S_c$ phase may be converted into a chiral $S_c$ phase by the addition of a chiral additive, eg 10% by weight of Compound 3 of formula:

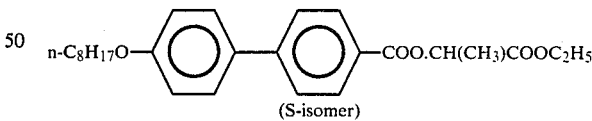
(S-isomer)

which also imparts a strong spontaneous polarisation $P_s$.

EXAMPLE 7

| | |
|---|---|
| 2-Fluoro-4-(+-2-methylbutyl) phenyl-4'-n-octyloxy--biphenyl-4-carboxylate. | 20 wt % |
| 2-Fluoro-4-n-pentylphenyl-4'-n-octyloxybiphenyl-4-carboxylate | 32.5 wt % |
| 2-Fluoro-4-n-pentylphenyl-4'-n-octylbiphenyl-4-carboxylate. | 32.5 wt % |
| (+)-2-octyl (4'-n-nonyloxybiphenyl)-4-carboxylate | 15 wt % |

Transition temperatures (°C.) $S_B$-$S_C$=8, $S_C$-$S_A$=66, $S_A$-Ch=100.5, Ch-I=122. This mixture therefore exhibits a room temperature (c.20° C.) ferroelectric smectic phase. The variation of Ps with temperature of this mixture is tabulated below, and shown graphically in FIG. 2.

| T °C. | Ps (nC/cm²) |
|---|---|
| 10 | 29.9 |
| 20 | 22.0 |
| 30 | 19.8 |
| 40 | 15.8 |
| 50 | 12.3 |
| 55 | 10.1 |
| 60 | 7.6 |
| 65 | 3.1 |

EXAMPLE 8

| | |
|---|---|
| 4-(+-2-methylbutyl) phenyl 4'-n-octylbiphenyl-4-carboxylate. | 50 wt % |
| 2-Fluoro-4-(+-2-methylbutyl)phenyl 4'-n-octyloxy-biphenyl-4-carboxylate. | 50 wt % |

This mixture has an $S_C$ phase between 47° C. and 97° C. The Ps of the mixture was 1 nC/cm² at 90° C.

EXAMPLE 9

| | |
|---|---|
| 4-n-Pentyloxyphenyl-4-n-octyloxybenzoate | 50 wt % |
| 2-Fluoro-4-(+-2-methylbutyl)phenyl 4'-n-octyloxy--biphenyl-4-carboxylate. | 50 wt % |

Transition temperatures (°C.) of this mixture were: $S_B$-$S_C$=23, $S_C$-$S_A$=82, $S_A$-Ch=86, Ch-I=113. Ps was 0.35 nC/cm² at 40° C.

EXAMPLE 10

| | |
|---|---|
| 2-Fluoro-4-n-pentylphenyl-4'-n-octylbiphenyl--4-carboxylate. | 30 wt % |
| 2-Fluoro-4-n-pentylphenyl-4'-n-octyloxybiphenyl-4-carboxylate. | 30 wt % |
| 2-Fluoro-4-n-heptylphenyl-4'-n-heptyloxybiphenyl-4-carboxylate. | 30 wt % |
| n-Octyl-(+)-2-(4'-n-octyloxybiphenyl-4-carboxy)-propionate. | 10 wt % |

(the optically active dopant in this mixture is a derivative of lactic acid)

This mixture had an $S_C$ phase between room temperature and 87° C. The Ps of this mixture was 5.8 nC/cm² at 30° C. and 3.1 nC/cm² at 70° C.

EXAMPLE 11

| | |
|---|---|
| 2-Fluoro-4-n-pentylphenyl-4'-n-octyloxy-biphenyl-carboxylate 2-Fluoro-4-n-pentylphenyl-4'-n-octylbiphenyl-carboxylate in a 1:1 molar ratio. | 79.64 mole % |
| (−)-(2-octyl)-4'-n-octyloxybiphenylcarboxylate | 20.36 mole % |

Figure 3:
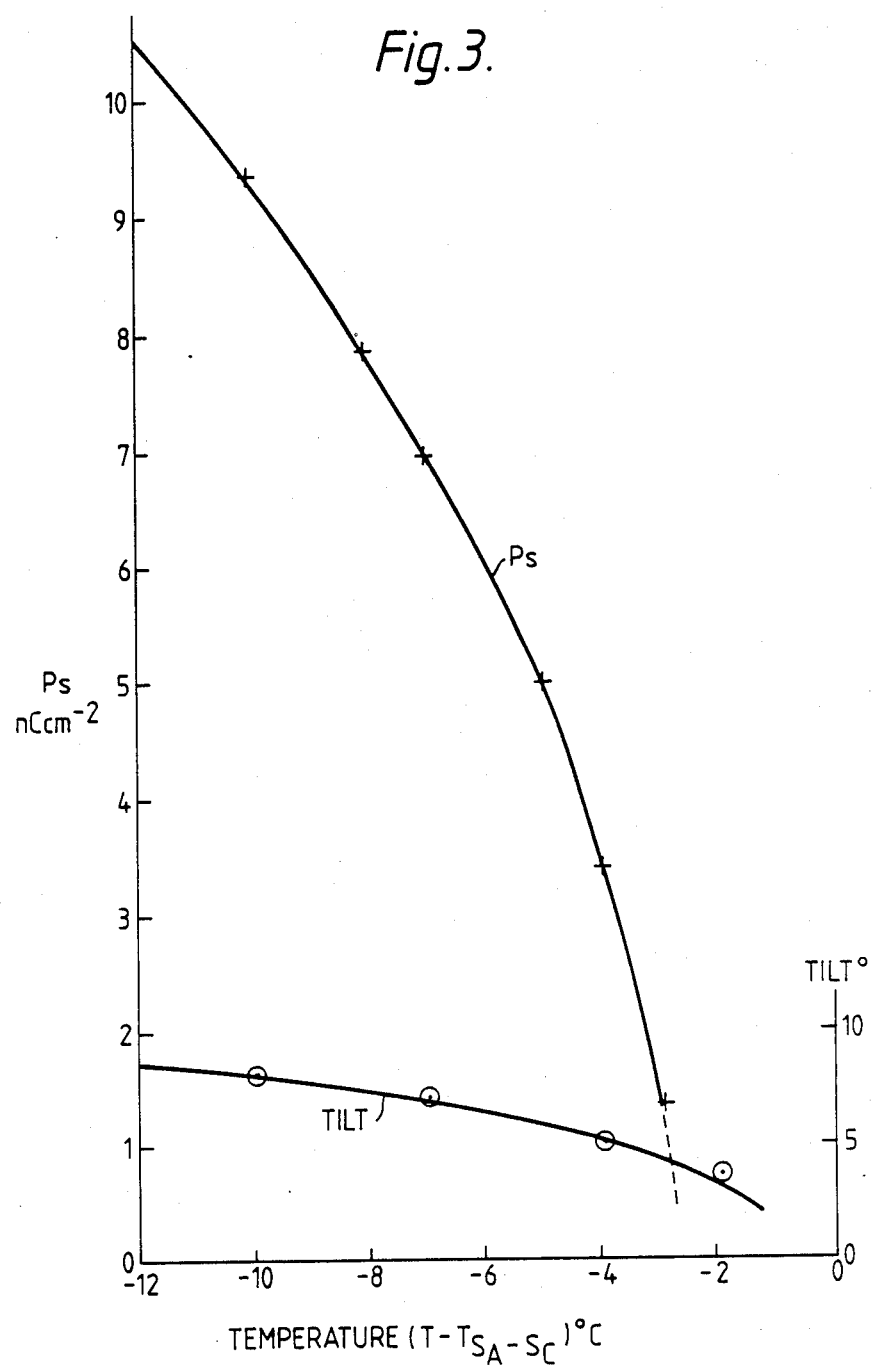
FIG. 3 is a graph of Ps and tilt angle against temperature of the mixture of Example 8.

Transition temperatures (°C.) of this mixture were: $S_C$-$S_A$=42.3, $S_A$-Ch=95, Ch-I=119. The $S_C$ phase remained at room temperature. The variation of Ps and the tilt angle with temperature of this mixture is shown graphically in FIG. 3.

An example of the use of a compound of Formula I in a liquid crystal material and device embodying the present invention will now be described with reference to FIG. 4.

Figure 4:
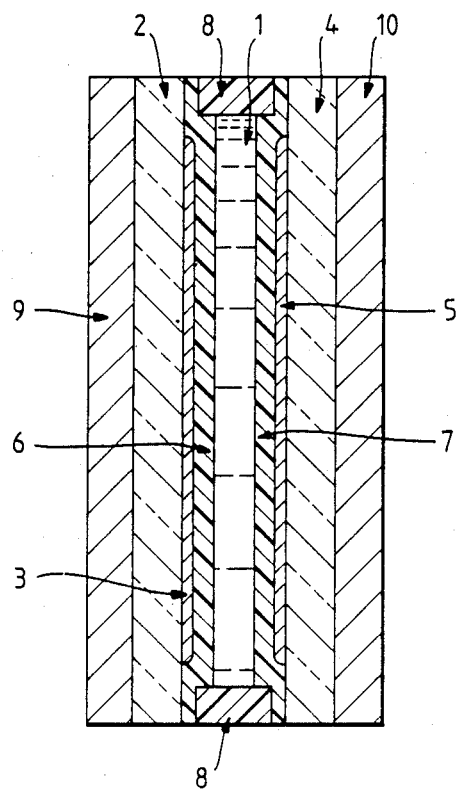
FIG. 4 is a cross-sectional end view of a liquid crystal shutter.

In FIG. 4 a liquid crystal cell comprises a layer 1 of liquid crystal material exhibiting a chiral smectic phase sandwiched between a glass slide 2 having a transparent conducting layer 3 on its surface, eg of tin oxide or indium oxide, and a glass slide 4 having a transparent conducting layer 5 on its surface. The slides 2,4 bearing the layers 3,5 are respectively coated by films 6,7 of a polyimide polymer. Prior to construction of the cell the films 6 and 7 are rubbed with a soft tissue in a given direction the rubbing directions being arranged parallel upon construction of the cell. A spacer 8 eg of polymethylmethacrylate, separates the slides 2,4 to the required distance, eg 5 microns. The liquid crystal material 1 is introduced between the slides 2,4 to the required distance, eg 5 microns. The liquid crystal material 1 is introduced between the slides 2,4 by filling the space between the slides 2, 4 and spacer 8 and sealing the spacer 8 in a vacuum in a known way. Preferably, the liquid crystal material is in the smectic A or isotropic liquid phase (obtained by heating the material) when it is introduced between the slides 2,4 to facilitate alignment of the liquid crystal molecules with the rubbing directions on the slides 2,4.

A suitable liquid crystal composition for the material 1 is as follows:

Composition 1 comprising Compounds 1, 2 and 3 as specified above in the following proportions:

Composition 1

Compound 1: 27% by weight
Compound 2: 63% by weight
Compound 3: 10% by weight

A polarizer 9 is arranged with its polarization axis parallel to the rubbing direction on the films 6,7 and an analyzer (crossed polarizer) 10 is arranged with its polarization axis perpendicular to that rubbing direction.

When a square wave voltage (from a conventional source not shown) varying between about +10 volts and −10 volts is applied across the cell by making contact with the layers 3 and 5 the cell is rapidly switched upon the change in sign of the voltage between a dark state and a light state as explained above.

Figure 2:
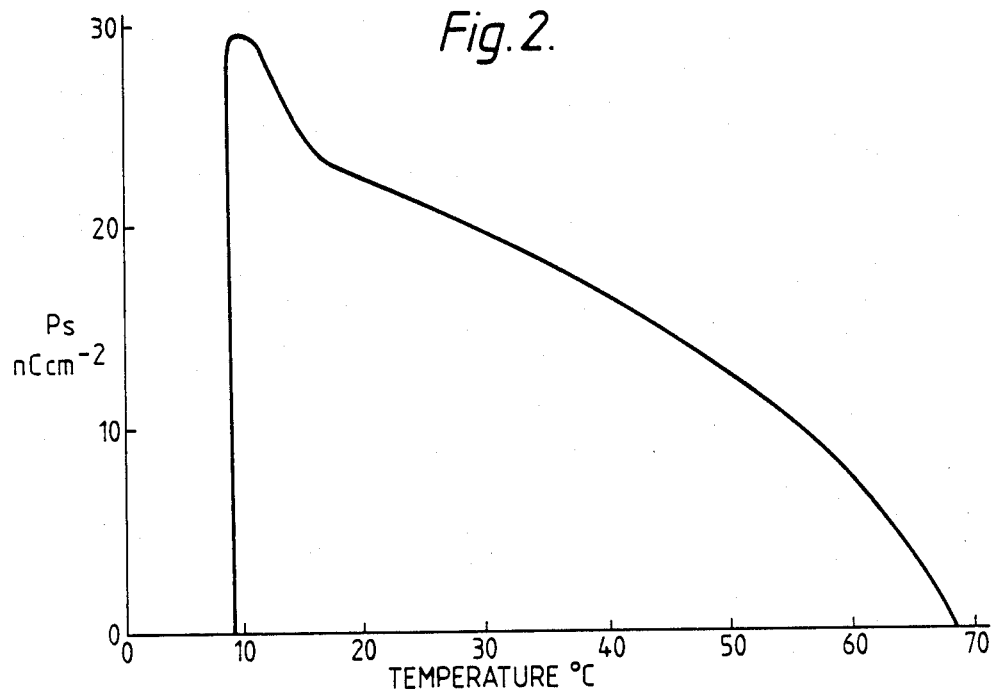
FIG. 2 is a graph of Ps against temperature of the mixture of Example 7.

In an alternative device (not shown) based on the cell construction shown in FIG. 2 the layers 3 and 5 may be selectively shaped in a known way, eg by photoetching or deposition through a mask, eg to provide one or more display symbols, eg letters, numerals, words or graphics and the like as conventionally seen on displays. The electrode portions formed thereby may be addressed in a variety of ways which include multiplexed operation.

The mixtures of Examples 7 and 10 may also be used in the device illustrated in FIG. 4 as described above.

We claim:

1. A compound having a formula IA:

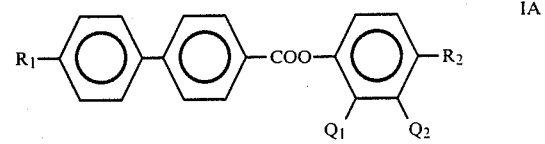

IA wherein $R_1$ represents $C_3$–$C_{12}$ alkyl or alkoxy, $R_2$ represents $C_3$–$C_{12}$ alkyl, one of $Q_1$ or $Q_2$ is fluorine and the other is hydrogen, provided that when both $R_1$ and $R_2$ are n-alkyl then the total number of carbon atoms in $R_1$ and $R_2$ is more than 12.

2. A compound as claimed in claim 1, in which $R_1$ is n-alkyl or n-alkoxy.

3. A compound as claimed in claim 1 wherein $R_1$ or $R_2$ is a chiral group in an optically active or racemic form.

4. A compound as claimed in claim 1 having a formula selected from the group consisting of:

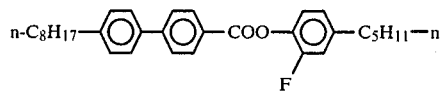

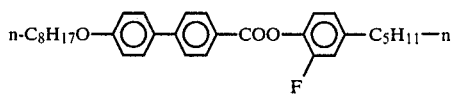

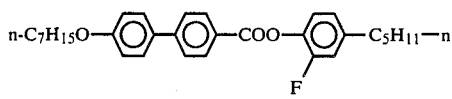

5. A liquid crystal material being a mixture of compounds at least one of which is a compound as claimed in claim 1.

6. A liquid crystal material being a mixture of compounds at least one of which is a compound as claimed in claim 2.

7. A liquid crystal material as claimed in claim 6, and wherein $R_2$ is n-alkyl.

8. A liquid crystal material being a mixture of compounds at least one of which is a compound as claimed in claim 3.

9. A liquid crystal material as claimed in claim 5 which contains in addition at least one optically active compound, the mixture having a ferroelectric smectic phase.

10. A liquid crystal material as claimed in claim 9, wherein the optically active compound is a derivative of lactic acid.

11. A liquid crystal material as claimed in claim 9, wherein the optically active compound is an ester of an optically active secondary alcohol.

12. A liquid crystal electro optical device which incorporates a liquid crystal material as claimed in claim 5.

13. A liquid crystal electro optical device which incorporates a liquid crystal material as claimed in claim 9.

* * * * *